(12) United States Patent
Chen et al.

(10) Patent No.: US 7,529,371 B2
(45) Date of Patent: May 5, 2009

(54) REPLACEABLE SEQUENCED ONE-TIME PADS FOR DETECTION OF CLONED SERVICE CLIENT

(75) Inventors: Yen-Fu Chen, Austin, TX (US); John Hans Handy-Bosma, Cedar Park, TX (US); Jun Sawada, Austin, TX (US); Mei Yang Selvage, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 10/829,571

(22) Filed: Apr. 22, 2004

(65) Prior Publication Data

US 2005/0239440 A1    Oct. 27, 2005

(51) Int. Cl.
*H04K 1/00* (2006.01)
*H04L 9/00* (2006.01)
*H04M 1/66* (2006.01)

(52) U.S. Cl. .................. 380/247; 380/250; 380/260; 455/411

(58) Field of Classification Search .......... 380/247, 380/250, 260; 455/411
See application file for complete search history.

(56) References Cited

U.S. PATENT DOCUMENTS

| 5,293,576 A | * | 3/1994 | Mihm et al. | 713/170 |
|---|---|---|---|---|
| 5,940,002 A | * | 8/1999 | Finn et al. | 340/5.26 |
| 6,021,203 A | | 2/2000 | Douceur et al. | 380/49 |
| 6,266,413 B1 | | 7/2001 | Shefi | 380/46 |
| 6,445,794 B1 | | 9/2002 | Shefi | 380/46 |
| 6,480,831 B1 | | 11/2002 | Cordery et al. | 705/60 |
| 6,891,952 B1 | * | 5/2005 | Puehlhoefer et al. | 380/262 |
| 7,009,940 B2 | * | 3/2006 | Vialen et al. | 370/252 |
| 2003/0112972 A1 | * | 6/2003 | Hattick et al. | 380/46 |

OTHER PUBLICATIONS

"FCC Consumer Advisory, Cell Phone Fraud," pp. 1-3, Apr. 7, 2004, published at http://www.fcc.gov/cgb/consumerfacts/cellphonefraud.html.

(Continued)

*Primary Examiner*—Kimyen Vu
*Assistant Examiner*—Suman Debnath
(74) *Attorney, Agent, or Firm*—Robert H. Frantz; David A. Mims, Jr.

(57) ABSTRACT

Authentication of cellular telephone device by providing a first one-time pad cryptological table to a security server which has multiple sequenced One Time Pad value entries including a previous use indicator initialized as "unused", and providing a second one-time pad cryptological table to an authentic device initially synchronized with the first table. A cloned copy of the second table is stored in an inauthentic cellular telephone device, these third table being initially synchronized with the second table. The authentic device selects an unused entry in the second table and transmits it to the server when requesting service. If the received entry matches a next sequential unused entry in the first table, the server grants service, and both server and authentic device mark that entry as used. If the received entry does not match a sequentially next unused entry in the first table, service is denied to the requesting device.

12 Claims, 10 Drawing Sheets

| ESM | UID | Seq | Session ID | Used |
|---|---|---|---|---|
| C23nx8 | 1_A | 1 | EgUa7E | Yes |
| E7849o | 1_B | 2 | y898Op | Yes |
| P98viO | 1_C | 3 | Wt65m0 | No |
| uie7p8 | 1_D | 4 | MU9y54 | No |
| QP06y | 1_E | 5 | Vrw8op | No |
| • | • | • | • | • |
| • | • | • | • | • |
| • | • | • | • | • |

31    32    33    34    35

OTHER PUBLICATIONS

"Xilinix Technology Can Disable Stolen Cell Phones—and Restore Them When Recovered", Karen Parnell, Apr. 7, 2004, published at http://xilinx.com/publications/products/cool2/xc_cellphone43.htm.

"Unbreakable Encryption Using One Time Pads", Christoph Wille, Apr. 7, 2004 published at http://aspheute.com/english/20010924.asp.

"GSM Cloning", pp. 1-3, Apr. 7, 2004, published at http://isaac.cs.berkeley.edu/isaac/gsm.html.

Bluetooth is Attack Vector for Mobile Phones, John Leyden, pp. 1-2. Apr. 7, 2004, published at http://www.securityfocus.com/news/7466.

Intermediate Report on UMTS Security Mechanisms, USECA, Klaus Miller, Siemens AG, pp. 1-73. Apr. 6, 2004, published at http://www.umts-forum.org/servlet/dycon/ztumts/umts/Live/en/umts/Home.

"IBM: Cell Phones Easy Targets for Hackers," Robert Lemos, Feb. 24, 2004, pp. 1-3, published at http://zdnet.com.com/2100-1105-902149.html.

"Cell Phone Security", Feb. 24, 2004, pp. 1-3, published at http://www.cit.cornell.edu/cellphone/security.html.

* cited by examiner

| ESM | UID | Seq | Session ID | Used |
|---|---|---|---|---|
| C23nx8 | 1_A | 1 | EgUa7E | Yes |
| E7849o | 1_B | 2 | y898Op | Yes |
| P98viO | 1_C | 3 | Wt65m0 | No |
| uie7p8 | 1_D | 4 | MU9y54 | No |
| QP06y | 1_E | 5 | Vrw8op | No |
| ... | ... | ... | ... | ... |

Figure 3

REPLACEABLE SEQUENCED ONE-TIME PADS FOR DETECTION OF CLONED SERVICE CLIENT

CROSS-REFERENCE TO RELATED APPLICATIONS

Not applicable.

FEDERALLY SPONSORED RESEARCH AND DEVELOPMENT STATEMENT

This invention was not developed in conjunction with any Federally-sponsored contract.

MICROFICHE APPENDIX

Not applicable.

INCORPORATION BY REFERENCE

Not Applicable.

BACKGROUND OF THE INVENTION

1. Field of the Invention

This invention relates to technologies for security of service consumption by client devices from server devices, and especially by wireless network client devices such as portable telephones and wireless network interface adapters.

2. Description of the Related Art

The proliferation of mobile networked client devices, and especially wireless networked devices, is widespread, from Personal Communications System ("PCS") and Global System for Mobile ("GSM") telephones, to wireless network interfaces for laptop computers and Personal Digital Assistants ("PDA"), and to short-range wireless interfaces such as Blue Tooth. As the technology advances, more functionalities are developed to significantly enhance these devices at a breakneck pace in order to meet market needs. In this disclosure, we will discuss primarily issues and problems associated with cellular telephones, but which apply equally well to these other types of devices, as well.

Cellular Network Operation Overview

Though cell phones are widely used and have many advantages, cell phone users are faced with phone security concerns, which is considered one of the biggest problems in wireless communication. Cell phone security can be broken down into two categories:

(1) people listening into cell phone conversations (e.g. "snooping"); and
(2) people illegally consuming services identified to an user's account, which is frequently referred to as cell phone cloning.

Traditional "analog" cell phones transmit control data and voice information in plain Frequency Modulation ("FM"), which produces a security weakness wherein thieves have an opportunity to easily tap into a phone conversation to snoop. This problem was in part addressed by newer technologies in digital (e.g. PCS, GSM) cell phones, which have more robust security utilizing an encryption technique to secure the phone and its conversation.

The standard encryption process works by defining a "key", which is stored internally into the telephone, that is used in an equation that compresses the audio information. The encrypted key is sent to the cell tower so the cell tower will know how to decode the conversation. It is more difficult to snoop into the conversation with a scanner because ordinarily a third party would not have the key for decrypting the information being exchanged between the cell tower and the mobile device.

A key characteristic of cellular phone systems is the division of a city into small cell units that allows extensive frequency reuse across a city enabling millions of people to use cell phones simultaneously. Cell phones also have low-power transmitters and relatively low power consumption. The cellular approach requires a large number of base stations and towers to be placed in cities of any size where a phone carrier in each city typically runs one central office called a Mobile Telephone Switching Office ("MTSO").

All cell phones have special codes associated with them. These codes are used to identify the phone, its owner and the service provider. When a cell phone is manufactured, each phone has an Electronic Serial Number ("ESN"), a unique 32-bit number preprogrammed into the phone.

When the phone is first turned on, it listens for a Systems Identification Code ("SID") on a predetermined control channel. The control channel is a special frequency that the phone and the base station use to talk to one another about items like call set-up and channel changing. When the SID is received, it is compares to the SID programmed on the phone for a match to verify that the cell phone is communicating with the appropriate service provider.

The cell phone periodically transmits a registration request during each call session so the MTSO can keep track of the phone's location in a database. In this manner, when a phone call is made, a MTSO is constantly able to locate the correct cell tower, and to utilize a Mobile Identification Number ("MIN"), a 10 digit number derived from actual phone number of the mobile device, to transmit the signals to the designated receiver.

Generally speaking, in North America, a standard called Personal Communications Systems ("PCS") is employed, while throughout much of the rest of the world, a standard called Global System for Mobile ("GSM") is used. While these systems vary in the details of implementation, their protocols and processes are very similar for a generalized view point.

Turning to FIG. 1, it depicts in a general sense how a call is typically handled between cell phones or a similar device such as a PDA, and its service provider, such as AT&T, Sprint, or Cingular (10). A truly authorized cell phone for this service and account, which we will refer to as an authentic device (13), initiates a session (11) to a service provider (16), but providing a basic Authorization Identifier (12) value with the session request, such as an Electronic Serial Number.

The service provider verifies (14) the received AuthID (12) against a database of known accounts (18). Once verification is complete, the service provider (16) grants the session (15). During the session, a service is consumed (16), such as minutes of talk time or kilobytes of data transferred, until the mobile device releases the session (17). Following completion of the session, appropriate account steps are performed to charge an account associated with the user registered to the particular mobile device for the service consumed, eventually resulting in a charge on an invoice to the consumer.

Mobile Device Cloning

"Cloning" a mobile device generally refers to programming a mobile device to simulate a properly authorized device such that the clone device can obtain and consume service from a service provider, while the costs for the service are charged to a user without his or her knowledge or approval. Often, a cloned device is only usable until one billing period for the victimized user transpires, after which the user detects the unauthorized use, and notifies the service provider, which results in disabling of the account so that both the authorized device and any clone(s) are no longer able to use that account. Depending on the service contract and/or local laws and regulations, the user may be responsible for the charges, the service provider may have to absorb the charges, or some combination of the two may be required. However, even with the newer digital technologies employed in cell phones, the number of cell phone cloning cases continues to rise, which costs service providers an estimated $500 million a year.

PCS utilizes a "soft" programmable ESN which is programmed easily into the phone when it is issued to a user when an account is established. This technique, although intended to allow for quick reprogramming of the device in case it was cloned, actually promoted cloning of stolen telephones by allowing stolen telephones to be quickly programmed as clones.

GSM digitizes and compresses data using a removable Subscriber Identify Module ("SIM") card that is plugged into the cell phone, which was originally thought to add additional security to the phone to protect it from cloning. But even with its sophisticated technology, cell phone cloning remains a problem when modified SIM cards are installed. It has been proven that at certain times, such as powering up a GSM telephone, the identification data stored on the SIM can be remotely snooped by a thief using a special receiver due to power fluctuations caused when the device reads the SIM card.

Generally speaking, mobile device cloning can occur in many ways, one form of which is gaining physical access to a device such as a PCS or GSM phone, which can be achieved by thieves stealing the phone and copying the private data using an appropriate programmer, or through newer wireless technologies such as Blue Tooth.

A second cloning method to reprogram a wireless device so that it acts as a "prepaid" device with unlimited credits on the user account. Alternatively, thieves can also purchase one cell phone service and then clone the phone, duplicating phones with the same phone service and generate profit from distribution of these cloned phones.

Yet a fourth cloning alternative is to use a radio receiver to receive the ESN and MIN values transmitted during service sessions, and programming a device to use the same identifier values, which results in two or more mobile devices both using the same unique identification information with service provider. As such, cloning remains a major problem that affects both analog and digital communication standards.

FIG. 2 shows a generalization of a scenario between a cloned device and service provider when private data such as ESN and MIN (20) are stolen (22). A authentic device (13) communicates (11, 15, 16, 17) normally with a service provider (16) to establish an authorized session, during which the AuthID (12) of the authentic device (13) may be captured by a snooping device, as previous discussed. Alternatively, the AuthID (12) may be accessed physically by obtaining the phone (e.g. stealing the phone or GSM SIM card).

When fraudulent theft occurs to an authentic device (13), the AuthID (12) is copied (22) into a cloned device (21), giving the cloned device an internal AuthID (12') which simulates that of the authentic device making the cloned device (21) indistinguishable to the service provider (16).

When the cloned device initiates (23) a service session to a service provider (16), the service provider follows the normal processes to verify (14') the authorization identification (12') with its own collection (15) authorization identification values. Upon authentication, the service provider grants the requested service session (24) to the cloned device as if it were the authentic device, and service is consumed (25) (e.g. telephone conversation, web browsing, etc.) by the thief until the cloned device terminates (26) the session. Account usage is recorded (25), which may not be detected by the user of the authentic device until the next billing cycle (e.g. in the next invoice). Theft activities can continue until either the account holder disputes the billing charges at the end of billing cycle, or until the service provider somehow detects usage of the same device from different locations at the same time (e.g. the same telephone seems to be being used simultaneously in Dallas and in Houston).

Two approaches are used currently which attempt to resolve these problems, either through strong encryption or by physically encoding a device identifier onto a communication device. In both cases, thieves can still continue cloning using a multitude of techniques. In fact, both solutions do not solve the central business problem that a cloned device is capable of acting as it is a real authentic device for a considerable period of time, thus incurring loss of revenue, theft of service, and loss of goodwill with customers.

A second hurdle is that these solutions are cumbersome and discourage users from following intrusive security measures. For example, users of cell phones often fail to take advantage of keyboard lock options on the phone because they require the user to enter an unlocking code prior to dialing a number. While this would prevent certain types of cloning and unauthorized use, it would not prevent the cloning attempts which "snoop" the identification data during session set up or session maintenance. It is reasonable to expect, then, that it would not be marketable for the service provider to require user-driven authentication process such as a login with a password or PIN number.

Customers will, however, voluntarily and usually promptly report lost or stolen devices to the appropriate service provider to revoke a device's privileges. However, this does not resolve cloning of active phones, nor fraud of the other types previously discussed. In addition, the security of the unique private keys and data remains unprotected from theft.

A more advanced approach to security has been discussed by the USECA (UMTS SECurity Architecture) group in it's paper entitled "USECA D06 Intermediate report on UMTS security mechanisms", wherein UMTS abbreviates "Universal Mobile Telecommunications System". This document provides a detailed description of certain security threats and vulnerabilities in certain mobile telephone architectures, and it proposes an improved security approach as such:

> . . . additional security features have to be offered by the mechanisms utilized in UMTS to protect the access network. These additional features include enhancements in user identity confidentiality mechanisms, enhancements in the authentication and key agreement mechanisms to assure the freshness of the agreed keys (used e.g. to provide confidentiality or integrity) also to the user, or to assure the integrity of certain signaling messages to prevent sophisticated attacks. Changes in the security mechanisms in the access network may also have to be introduced because of changes in technology, e.g. the introduction of CDMA requires mechanisms different to the ones in GSM systems. (USECA D06 Intermediate Report on UMTS Security Mechanisms, Version F, Introduction section)

However, certain questions remain unresolved, and potential vulnerabilities exist even with this improved approach, including:

(a) their "count", which is a value shared between a phone attempting to access network services and an authorization or security server, can be rolled over, apparently to a maximum of 28, using just a 6-bit value;

(b) their "count" value is automatically updated on both client and server, apparently without using a separate two-phase commit process to ensure that the "count" value stays synchronized between the two;

(c) their "count" continues until there is a conflict, but a conflict is not initiated until a user dials in, following which the detected conflict apparently revokes the handset's service entirely, but it is not clear whether or not this provides a means to initiate a denial of service attack;

(d) their "count" characteristics is dependent on local Home Environment Service Network ("HE/SN") service agreements;

(e) their "count" value is not persistent on the client device, so there is no capability for non-repudiation;

(f) their "count" is communicated from the network server to the client device as clear data wrapped in encryption, such that if the encryption is compromised, the "count" is compromised, thereby allowing both the original and the clone to be intercepted; and (g) it appears that multiple clones can be programmed to recapture the correct count.

Additionally, it is unclear whether or not their "count" value is a special code of any type, and it is unclear if the sequence can be encrypted and set on the client devices. Further, if a "count" value is known, wrapping it as a known element with other elements may provide a seed to breaking the security algorithm.

Consequently, even with newer technology and security enhancements, cloning continues to increase and impact not only customers but service providers. The level of abuse and damages in using fraudulent services and devices is difficult to account and calculate due to its massive nature.

For these reasons, there exists a need in the art for a method which ensures that only one authentic device can use the appropriate services, and that any attempt by a cloned device to consume services will be promptly detected in order to minimize service theft. Preferably, a solution to this problem would interoperate with established network protocols and processes in a minimally intrusive manner so as to avoid user inconvenience that might lead to noncompliance with the security measures, and to minimize impact to device, network, and service provider equipment design.

DESCRIPTION OF THE DRAWINGS

The following detailed description when taken in conjunction with the figures presented herein present a complete description of the present invention.

FIG. 3 shows an example one time pad code table suitable for use with the present invention.

SUMMARY OF THE INVENTION

Figure 1:
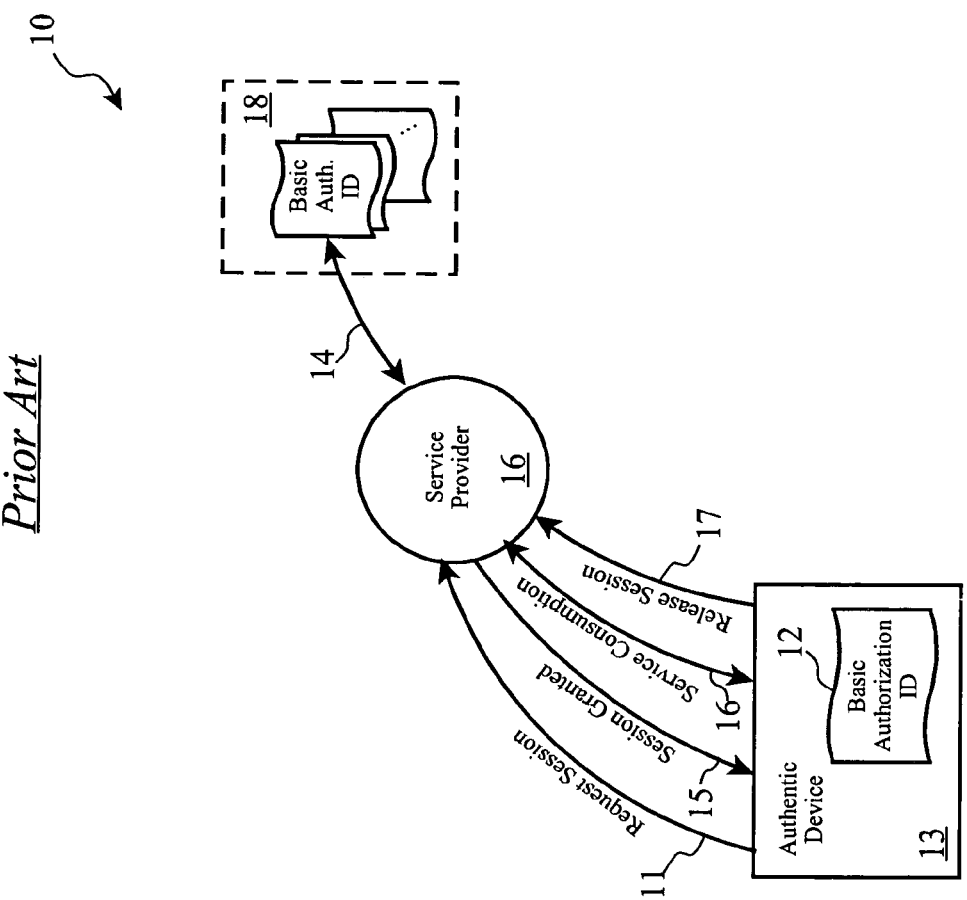
FIG. 1 depicts a typical process to establish and consume services by a client device such as a cell phone.
Figure 2:
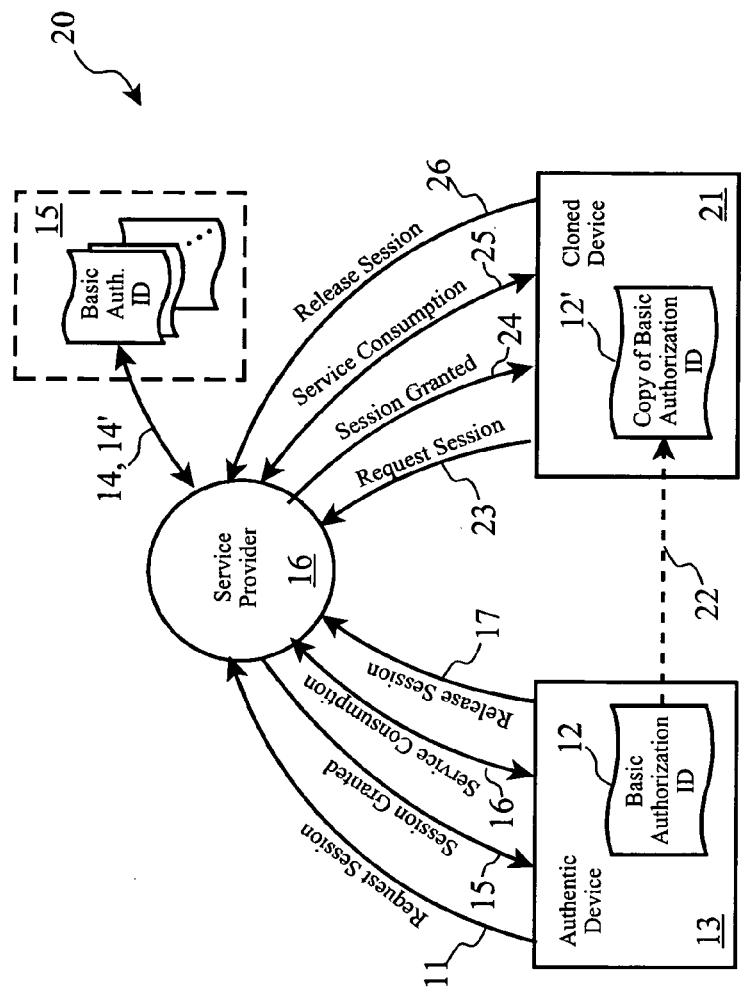
FIG. 2 illustrates the process of FIG. 1 wherein a clone device accesses and consumes services.

Authentication of cellular telephone device is accomplished by providing a first one-time pad cryptological table to a security server which has multiple sequenced One Time Pad value entries including a previous use indicator initialized as "unused", and providing a second one-time pad cryptological table to an authentic device initially synchronized with the first table. A cloned copy of the second table is stored in an inauthentic cellular telephone device, these third table being initially synchronized with the second table. The authentic device selects an unused entry in the second table and transmits it to the server when requesting service. If the received entry matches a next sequential unused entry in the first table, the server grants service, and both server and authentic device mark that entry as used. If the received entry does not match a sequentially next unused entry in the first table, service is denied to the requesting device.

DETAILED DESCRIPTION OF THE INVENTION

The present invention, referred to as Rapid Clone Detection/Authentic Device Reauthorization ("RCD/ADR") employs one-time pad ("OTP") cryptology in combination with a personal identification number ("PIN") or other user-driven authorization processes, in conjunction with processes to automatically detect the operation of a cloned device, automatically disabling the cloned device and the authentic device, and automatically re-authorizing the authentic device, with minimal effort or cooperation by the user of the authentic device. This invention is clearly distinct from previously employed or proposed methods through our use of one time pads to wrap session or other information which is not provided by these previous approaches. For example, the USECA UMTS process proposed use of one time codes, which has certain problems and vulnerabilities, as previously discussed.

One-Time Pads

OTP cryptology approaches require that both ends of a sender-receiver relationship share an encryption key that is the result of a randomly generated key sequence. To decrypt a received message, the receiver must possess or derive a matching OTP to decipher the information in the message. Mathematically, the OTP encryption algorithm is considered to be unbreakable as long as the private key is used only once. Several OTP algorithms are available in the art for use with present invention, and as such, it is within the skill of those in the art to select a suitable OTP method which meets the requirements of the particular application and environment, including message and key lengths, available processing bandwidth in the client device, etc. In the following examples, we will illustrate at least one embodiment of the present invention utilizing one available OTP process. It will be recognized by those skilled in the art that these examples, however, do not define the full scope or application of the present invention.

The following definitions will be employed throughout this disclosure:

(a) "One-Time Pad (OTP)" shall mean of a system in which a private key generated randomly is used only once to encrypt a message that is then decrypted by the receiver using a matching OTP and key, (b) "Encryption" shall mean the conversion of data into a form called ciphertext that cannot be easily understood by unauthorized users or systems;

(c) "Decryption" shall mean the process of converting encrypted data back into its original form so it can be understood.

The table (30) in FIG. 3 depicts an example of OTP values and sequence, a copy of which would be stored or available to both the client and the service provider (or security server for the service provider). The Session ID's (34) and ESN's (31) are unique, non-repeating sequences of numbers of a given size (e.g. 16 bits, 32 bits, 128 bits, etc.), depending on the desired encryption "strength". Use of larger random numbers (e.g. 128 bits instead of 16 bits) is generally considered to be more secure and more difficult to break.

The Sequence index (33) allows the device to easily manage which set of UID (32), ESN (31) and Session ID (34) are currently being used. Additionally, the Used parameter (35) marks which entries in the table have been used already, and which entries are still available for use, in order to avoid reuse of a previously used code set.

Initial Configuration of Device, Use of OTPs

Figure 4:
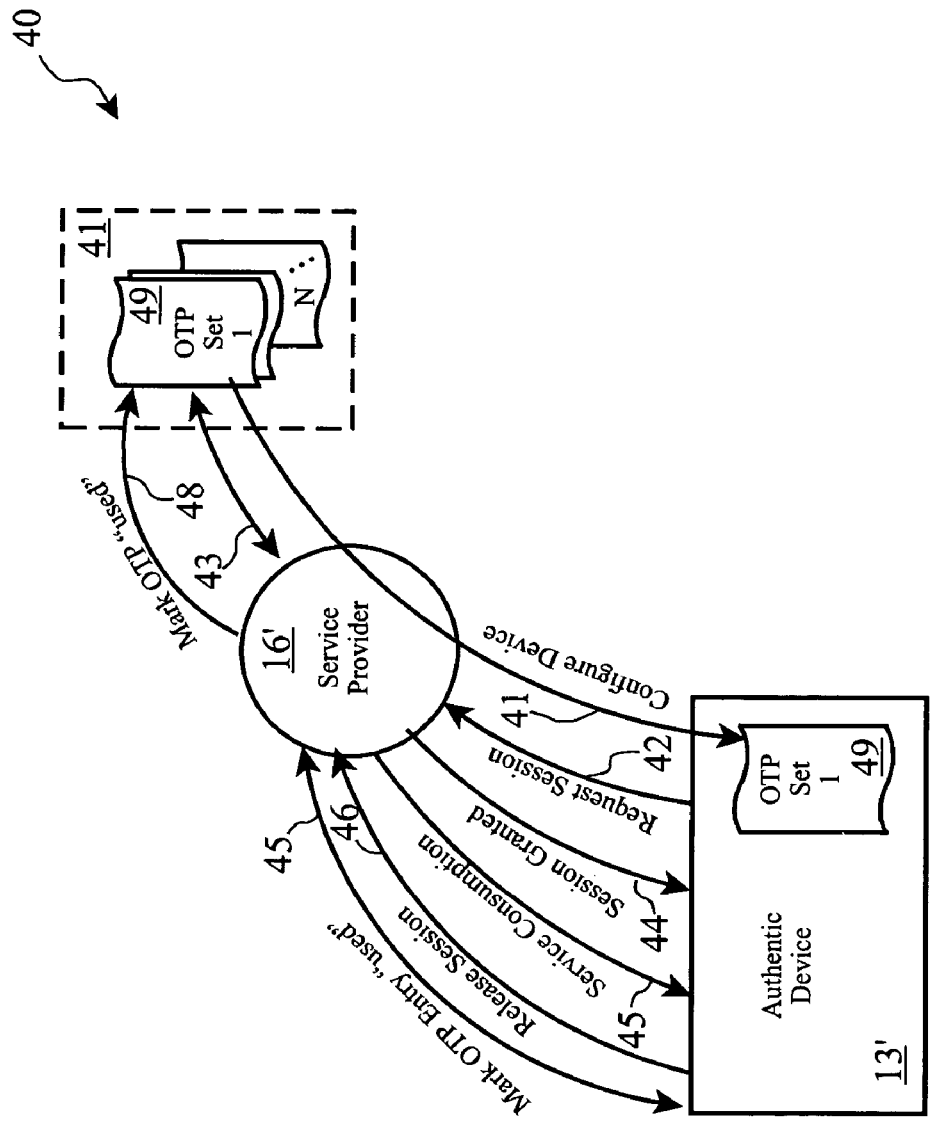
FIG. 4 illustrates the process of configuring an authentic device according to the invention, and establishing each service session with the authentic device.

When this invention is used during a typical call session, the level of security is greatly increased compared to the previous processes. FIG. 4 illustrates the process (40) according to our invention wherein when the client device is first configured (41) for service, the service provider downloads a unique sequence of OTP entries (49), as previously illustrated. Downloading can be accomplished by physical connection to the client device using a programmer (e.g. USB port, proprietary port, or wireless interface such as Blue Tooth or IrDA), or can be done through the network itself (e.g. the PCS or GSM network, the wireless LAN, etc.). We will refer to this initial set of OTP values as a first set, the purpose of which will become evident in the following discussion.

The service provider maintains a copy (49) of the OTP sequence in its database (41), associating this table of OTP entries with this customer and client device. In one embodiment of the present invention, the service provider may incorporate this security functionality into a separate security server, or may integrate this functionality into the point-of-access (e.g. tower, wireless POP, etc.) systems.

Bona Fide Service Consumption by Authentic Device

During legitimate, bona fide use or consumption of service according to our invention, the client device, such as a cell phone, initiates (42) a service session, such as a telephone call, during which the next unused OTP entry is provided in the service request. The enhanced service provider (16') proceeds with a verification process (43) to compare the OTP provided by the client with its own OTP entries (49) associated with the appropriate customer or device, and determines if this is the next expected unused entry in its own copy of the OTP table (49). As this is the legitimate, authentic device, the two tables (49) stored by the client (13') and the service provider (16') should be in synchronization with each other at this point.

Once authentication is complete, the session is granted (44) and service is consumed (e.g. telephone conversation ensues or data transmission is allowed) (45). The amount of service consumed will be tracked normally, until the session ends (46).

Either at the beginning of the session, during the session, or upon conclusion of the session, both the authentic device (13') and the enhanced service provider (16') mark (47, 48) the OTP which was used during the session as "used", as previously discussed, so as to avoid future reuse of the same code set. The OTP tables (49) should remain in synchronization with respect to which OTP entries are used and which are available for use.

Cloning Scenario of Devices Employing RCD/ADR

Figure 5:
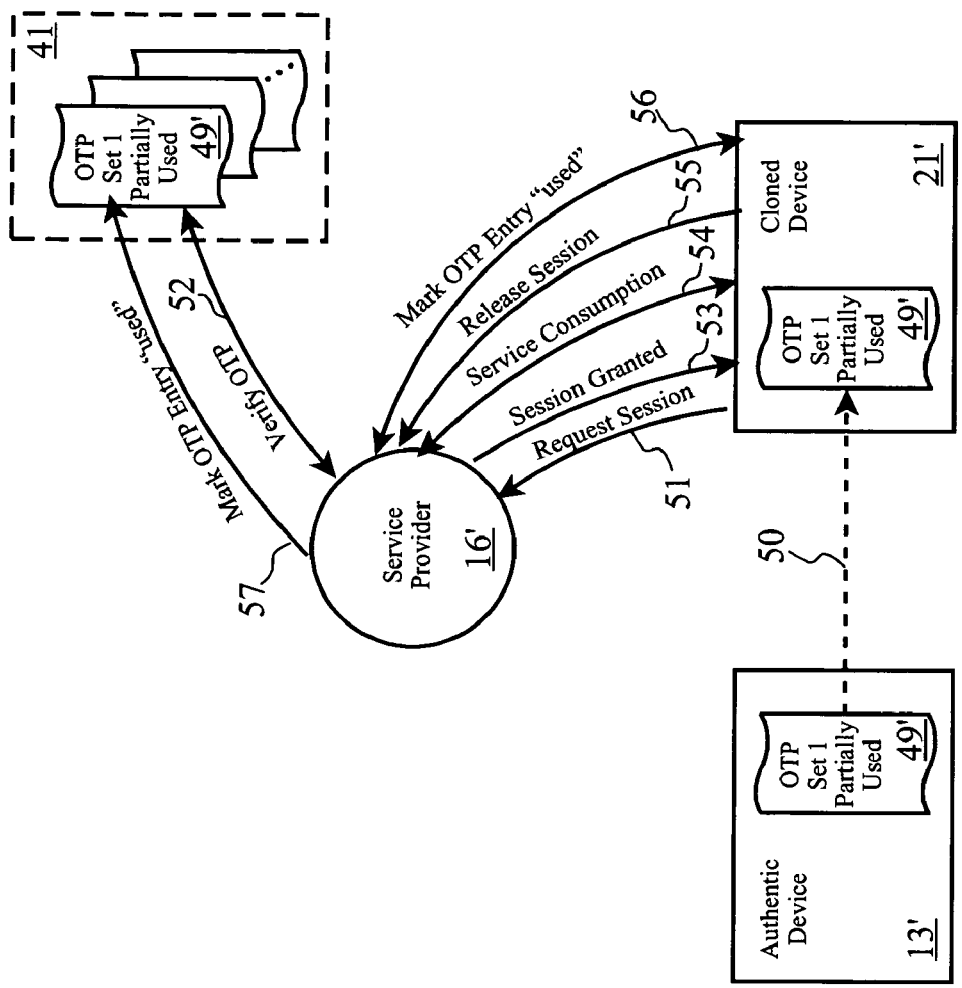
FIG. 5 illustrates the process of detection of attempts by a cloned device to obtain service according to the invention.

Turning to FIG. 5, a process or scenario is shown when an authentic device is cloned, and when that clone attempts to consume service from the service provider. The thief may attempt to clone the enhanced authentic device (13') by either capturing a single entry of the OTP table as it is being exchanged between the authentic device and the service provider, or by copying the entire partially-used OTP table (49'), such as by gaining physical access to the client device or its SIM card. It is important to note at this point, though, that the OTP tables at the service provider, the authentic device, and the newly cloned device (21') are likely synchronized.

If the cloned device (21') attempts to initiate (51) a session using a single, previously used OTP code set, the enhanced service provider (16') will immediately detect that this entry in its own OTP table is already marked "used", and recover steps will be immediately taken, and the cloned device (21') will be prevented from consuming services.

However, if the cloned device (21') has a copy of the OTP table and is designed to use the next available OTP entry, the cloned device may request service (51), which is validated (52) successfully against the service provider's partially-used OTP set (49'), is granted (53) the session, services are consumed (54), and the session is released or terminated normally (55), seeming to the service provider to have been a use by the authentic device. The used OTP entry is marked "used" (57, 56) by the cloned device (21') and the service provider (16'), but not by the authentic device (13'), as it was unaware of the cloned device's activities, of course.

Detection and Recovery from Fraudulent Clone Use

Figure 6:
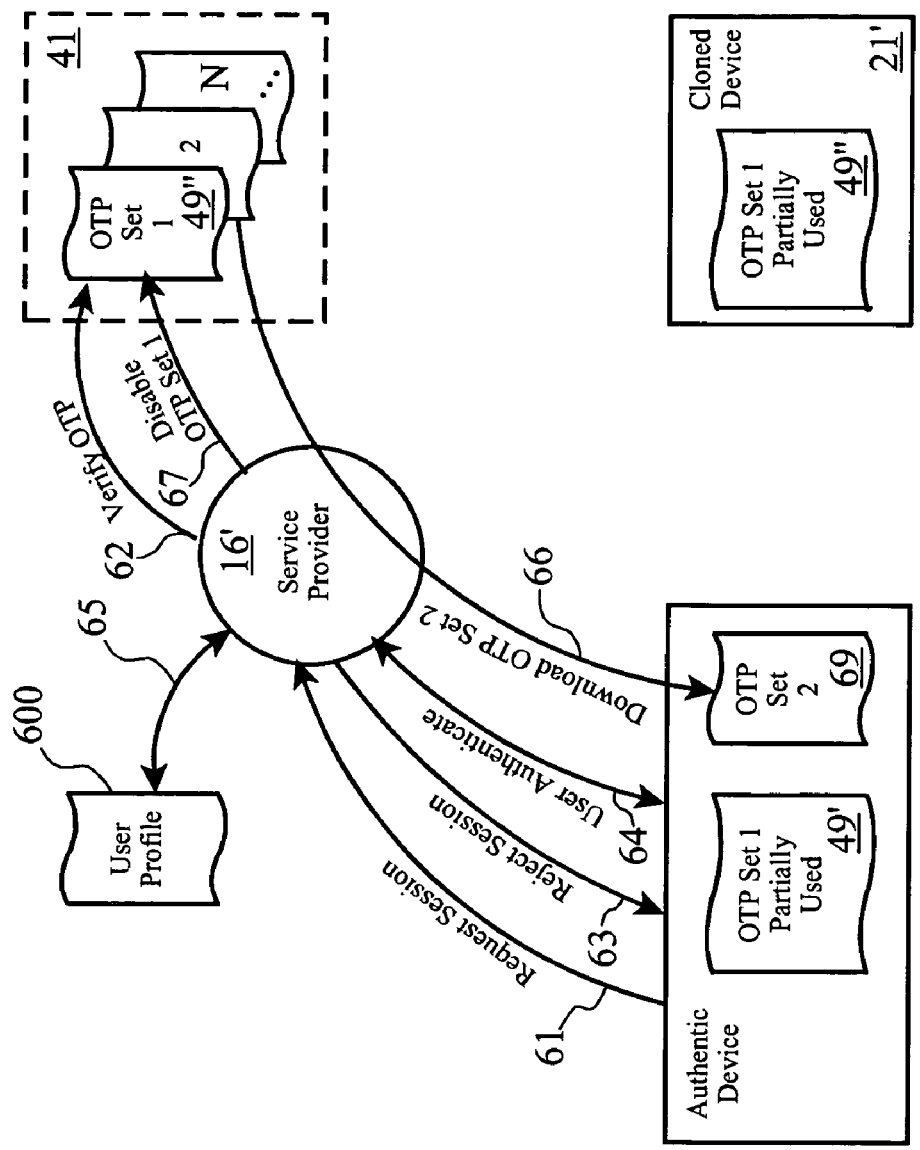
FIG. 6 shows how the authentic device is reconfigured to replace the compromised OTP table following successful challenging of the user.

Turning to FIG. 6, once a cloned device has been successfully used at least once, the OTP table (49') of the authentic device (13') is not synchronized with the OTP table (49") of the enhanced service provider (16'). For example, if the cloned device (21') has accessed services four times since it was initially cloned, the service provider's OTP set (49") will be marked with four additional "used" entries (e.g. the Sequence index will be advanced by 4) compared to the next available unused entry in the authentic device's OTP table (29').

As a result, when the authentic device (13') selects the next unused OTP entry in its table (49'), and uses that OTP code set to request (61) a service session, the verification (62) of that OTP entry will fail as it will represent a previously-used OTP entry in the service provider's table (49"), and the session will be rejected as will all future sessions from the cloned device (not shown). (63).

At this point, the service provider is not sure which device is the clone and which is the authentic device, but it is certain that the OTP table has been compromised and thus is no longer secure to use. Therefore, a process to reinitialize a valid OTP table both at the service provider and the client device is instantiated.

During this process, the user of the device which is attempting to access service is "challenged" to authenticate himself, such as through providing a log-on type of screen requiring a user name and password which are preferably not stored in the client device (e.g. so that they cannot be cloned as well), or by routing the session to an interactive server such as an Voice Response Unit ("VRU") which provides an audible menu to enter an account number, user number, password, or speak a password which is recognized by "voice print" technology. Other user challenge and authentication methods may be employed, as well, at this stage, such as calling the user at a telephone number and requiring an answer, sending an email to the user and requiring an answer, etc. A User Profile (600) is preferably accessed (65) to determine the method and appropriate responses to the challenge process.

Following successful challenge and authentication (64) of the user, the device which is currently being used is assumed to be the authentic device, and a new OTP table (69) is downloaded (66) to the authentic device (13') by the service provider (16'). The new OTP table (69) now becomes the official OTP table for future session authorization, and the old, partially-used table (49") is disabled or discarded.

Figure 7:
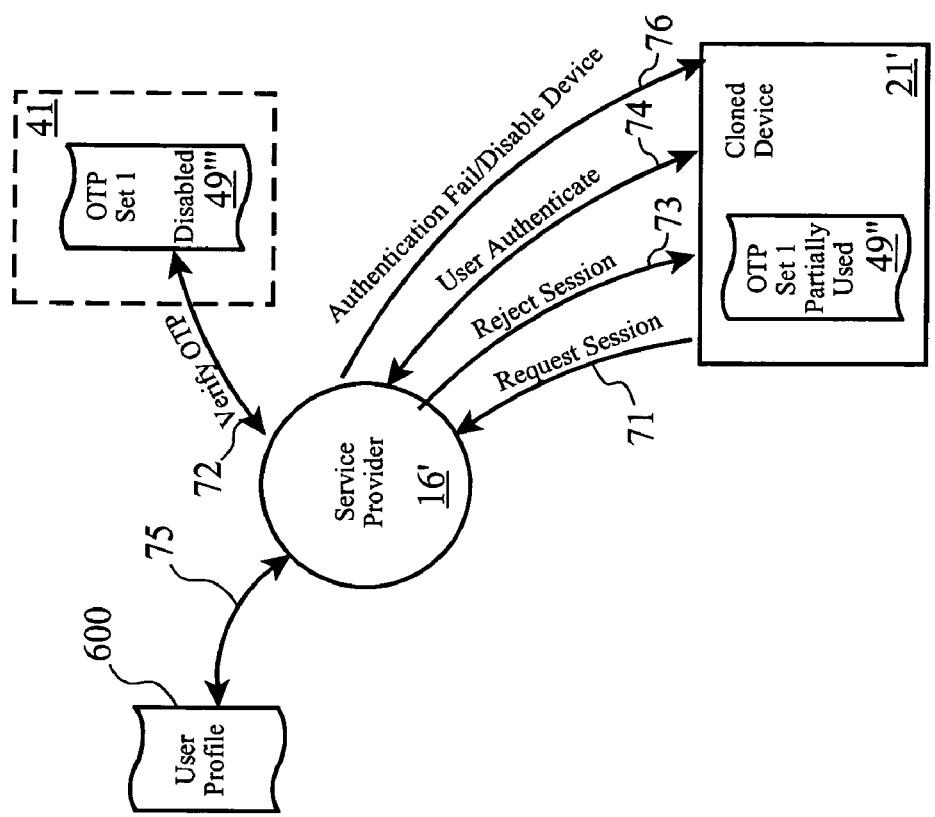
FIG. 7 depicts the process of challenging the clone user, and subsequently disabling service to the clone, according to the present invention.

This leaves the cloned device (21') with an entirely useless OTP set (49"), thereby preventing it from successfully accessing service again, as shown in FIG. 7, wherein the session request (71) includes an invalid OTP entry (72) or refers to an disabled OTP set (49'''), authentication the session is rejected (73), and the user authentication (74) fails (76) because the user of the cloned device is unaware of the password, PIN, account number, favorite color, etc. Thus, the cloned device is rendered inoperative, and fraud is stopped, while allowing the legitimate user to continue service securely with minimal inconvenience.

It is also important to note that the process shown in FIG. 7 would be followed in the instance where the cloned device captured only a single entry of an OTP table, and then tried to use that entry to access service. The service provider, detecting use of a previously used OTP entry, would challenge the user, and the user would fail to authenticate, so the existing OTP table would be disabled. On the next attempted use of the authentic device by the legitimate user, the process of FIG. 6 would be followed, during which the user would successfully respond to the challenge, followed by the authentic device being reconfigured to use a new, secure OTP table.

Alternate Uses and Embodiments of RCD/ADR

In an alternate use of the RCD/ADR invention, a service provider may use the invention to intially configure a device, such as a cell phone or wireless LAN access card, into service. When the uninitialized device attempts access to service, the service provider would challenge the user for authentication. A special user identification and password, for example, for a system installer or administrator could be used to authenticate the user, resulting in the selection and downloading of a first OTP table into the device.

In another alternate use of the present invention, the service provider could allow for consumer or end-user configuration of a new or replacement device. For example, consider a situation where a subscriber to cell phone service looses or has his telephone stolen. Instead of visiting an office for the service provider, he could simply call a customer service number and report the loss. The account could be set to be ready to recover and all clones disabled, and then the user could simply purchase a new, compatible uninitiated device from any retail outlet such as a computer or electronics superstore. Then, when the user tries to use the device for the first time, the user would be challenged, and the device would receive a new OTP table, as previously described.

In another variation of these alternate uses, "blank" devices could be sold in a retail environment, following which the user could select a service provider, establish an account with them, and then use the device for a first time, triggering the programming of the telephone.

In another alternative embodiment of the present invention, expiration dates or periods may be associated with entries in the OTB table, or with the entire table itself, so that the device using the table and entries must access services within a time out period, or be reconfigured upon the next use after the table (or entry) has expired. This may, in some situations, minimize the amount of time between clone activation and detection of the clone device. In a variation of the embodiment, the table may expire if not used for a first time (e.g. activated) within a specified period, which can protect from old tables being stolen, and add a "shelf life" factor to a device sold through retail operations.

According to another aspect of the present invention, authentication of the device may be initiated using normal strong encryption, following which the device is downloaded and configured to use a OTP table, thereby allowing a device to transition from the known security processes to our new inventive process.

According to yet another aspect of the present invention, the process of marking an OTP pad as "used" is expanded to include two phases in which certainty is established that the pad was actually used by the client device, thereby enhancing the ability to keep the OTP tables synchronized between the service provider and the client device, and minimizing unnecessary re-authentication and OTP downloads.

Logical Process of RCD/ADR

Figure 8:
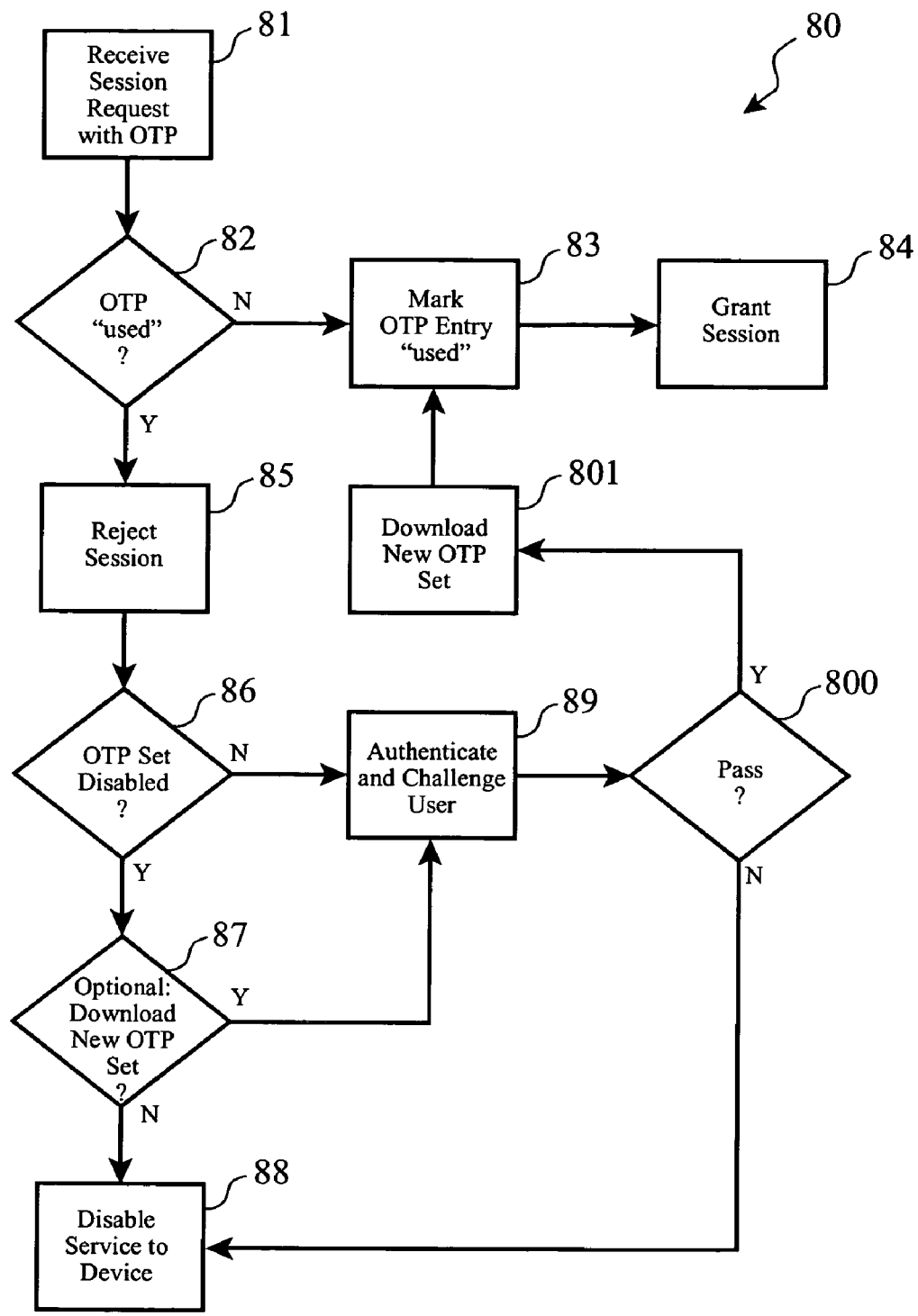
FIG. 8 shows the logical process of the present invention.

Turning to FIG. 8, a generalization of the logical process (80) of the present invention is shown. This process may be implemented as programs for execution on a suitable computing platform such as a server computer, and may be realized in a single program or in a set of cooperating programs. Some functionality may be delegated to the client devices, as well, without departing from the spirit and scope of the present invention.

When a request to initiate a service session is received (81), the OTP code(s) presented in the request are compared with a current table of OTP codes associated with the requesting device (or device owner). If the OTP code(s) are not currently marked as "used" (82) (e.g. it is an available code), and preferably if it is the next available code in the sequence of OTP codes in the local OTP table, the session is granted (84), and the code is marked (83) as "used" to avoid reuse in the future.

If, however, the OTP code(s) presented in the session request is already marked as used (82), or if the OTP code belongs to a previously disabled OTP table, the session request is rejected (85). If the OTP table to which the code belongs is not disabled, then the user is challenged to identify himself using a method such as a username/password, secret question, PIN number, etc. (89). If the user properly identifies himself/herself (800), then a new OTP table is downloaded to the device (801), keeping a local copy of the new table for association with that device in future authentication processes, and preferably marking the old OTP table as disabled. A first or current entry of the OTP table is marked as "used" (83) and the session is granted.

If the table to which the presented OTP code(s) belong is disabled (86) (e.g. fraud was previously detected), the system may optionally (87) challenge and authenticate the user (89), and download a new OTP table (801) as previously described. Otherwise, in some system implementations, it may not be desirable to allow reloading of the OTP table to a device which attempts to use a previously disabled OTP table, so the device is simply disabled (88) by denying service to it.

Suitable Computing Platforms

The invention is preferably realized as a feature or addition to the software and/or hardware already found present on well-known computing platforms such as personal computers, web servers, and web browsers. The logical processes and functions of the invention may be realized in part or entirely in circuitry, as well as software, equally well. Further, as computational power, memory, and network connectivity for many miniature and portable computing devices continues to increase, it is likely that certain portable devices such as handheld computers, PDAs, PIMS, and the like will be capable of being used to realize the invention, too.

As such, suitable computing platforms can include personal computers as well as portable computing platforms, such as personal digital assistants ("PDA"), web-enabled wireless telephones, and other types of personal information management ("PIM") devices. Therefore, it is useful to review a generalized architecture of a computing platform which may span the range of implementation, from a high-end web or enterprise server platform, to a personal computer, to a portable PDA or web-enabled wireless phone.

Figure 9:
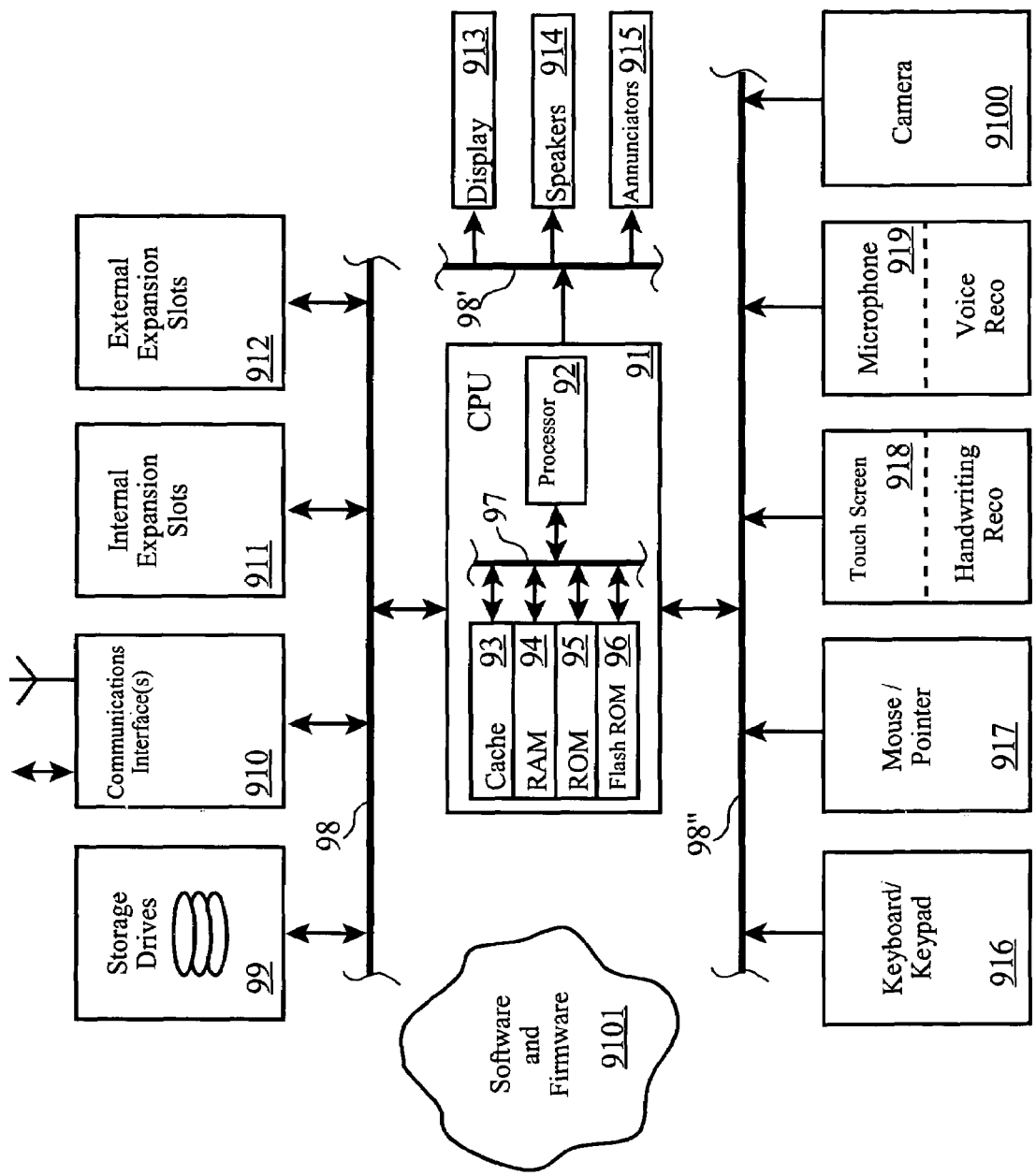
FIG. 9 depicts a generalized computing platform architecture, such as a personal computer, server computer, personal digital assistant, web-enabled wireless telephone, or other processor-based device.

Turning to FIG. 9, a generalized architecture is presented including a central processing unit (91) ("CPU"), which is typically comprised of a microprocessor (92) associated with random access memory ("RAM") (94) and read-only memory ("ROM") (95). Often, the CPU (91) is also provided with cache memory (93) and programmable FlashROM (96). The interface (97) between the microprocessor (92) and the various types of CPU memory is often referred to as a "local bus", but also may be a more generic or industry standard bus.

Many computing platforms are also provided with one or more storage drives (99), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (910), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (911, such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (912) allowing the user the ability to easily install and remove hardware expansion devices, such as PCMCIA cards, SmartMedia cards, and various proprietary modules such as removable hard drives, CD drives, and floppy drives.

Often, the storage drives (99), communication interfaces (910), internal expansion slots (911) and external expansion slots (912) are interconnected with the CPU (91) via a standard or industry open bus architecture (98), such as ISA, EISA, or PCI. In many cases, the bus (98) may be of a proprietary design.

A computing platform is usually provided with one or more user input devices, such as a keyboard or a keypad (916), and mouse or pointer device (917), and/or a touch-screen display (918). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (918) is usually provided, often with handwriting recognition capabilities.

Additionally, a microphone (919), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (913), are also provided with most computing platforms. The display (913) may take many forms, including a Cathode Ray Tube ("CRT"), a Thin Flat Transistor ("TFT") array, or a simple set of light emitting diodes ("LED") or liquid crystal display ("LCD") indicators.

One or more speakers (914) and/or annunciators (915) are often associated with computing platforms, too. The speakers (914) may be used to reproduce audio and music, such as the speaker of a wireless telephone or the speakers of a personal computer. Annunciators (915) may take the form of simple beep emitters or buzzers, commonly found on certain devices such as PDAs and PIMs.

These user input and output devices may be directly interconnected (98', 98") to the CPU (91) via a proprietary bus structure and/or interfaces, or they may be interconnected through one or more industry open buses such as ISA, EISA, PCI, etc. The computing platform is also provided with one or more software and firmware (101) programs to implement the desired functionality of the computing platforms.

Figure 10:
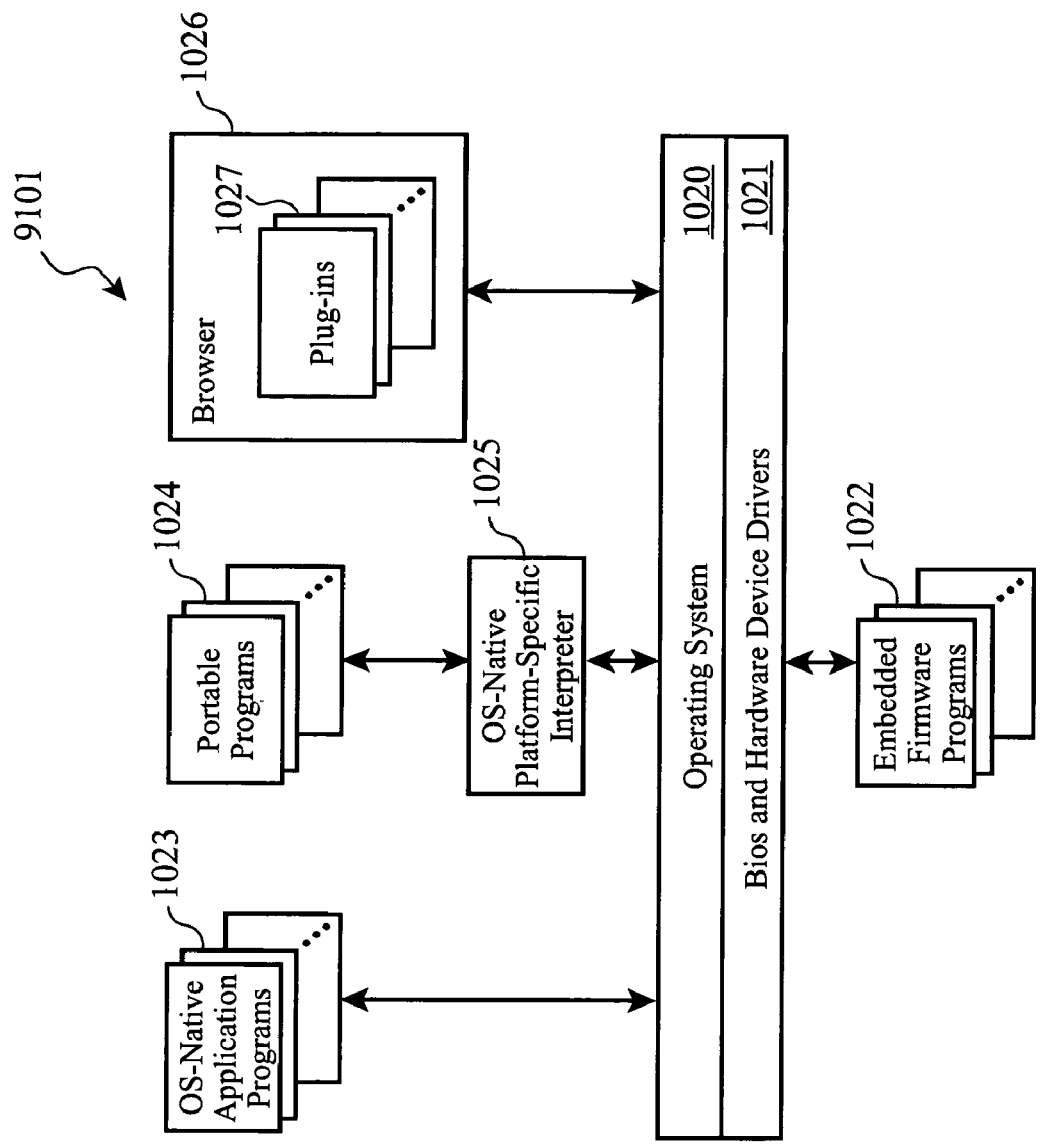
FIG. 10 shows a generalized organization of software and firmware associated with the generalized architecture of FIG. 9.

Turning now to FIG. 10, more detail is given of a generalized organization of software and firmware (9101) on this range of computing platforms. One or more operating system ("OS") native application programs (1023) may be provided on the computing platform, such as word processors, spreadsheets, contact management utilities, address book, calendar, email client, presentation, financial and bookkeeping programs.

Additionally, one or more "portable" or device-independent programs (1024) may be provided, which must be interpreted by an OS-native platform-specific interpreter (1025), such as Java™ scripts and programs.

Often, computing platforms are also provided with a form of web browser or micro-browser (1026), which may also include one or more extensions to the browser such as browser plug-ins (27).

The computing device is often provided with an operating system (1020), such as Microsoft Windows™, UNIX, IBM OS/2™, AS/400, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (1021) are often provided to allow the operating system (1020) and programs to interface to and control the specific hardware functions provided with the computing platform.

Additionally, one or more embedded firmware programs (1022) are commonly provided with many computing platforms, which are executed by onboard or "embedded" microprocessors as part of the peripheral device, such as a micro controller or a hard drive, a communication processor, network interface card, or sound or graphics card.

As such, FIGS. 9 and 10 describe in a general sense the various hardware components, software and firmware programs of a wide variety of computing platforms, including but not limited to personal computers, PDAs, PIMs, web-enabled telephones, and other appliances such as WebTV™ units, which may be suitable for realization of the invention.

CONCLUSION

It will be recognized by those skilled in the art that the specific details of various embodiments described herein are provided for illustration and disclosure of the invention, but do not represent limitations to the scope of the invention. Certain substitutions, variations and modifications which are within the skill of those in the art may be made without departing from the spirit and scope of the present invention. Therefore, the scope of the invention should be determined by the following claims.

What is claimed is:

1. A system for authenticating a client device requesting a session of service from a service provider, comprising:
    a first one-time pad cryptological table accessible by a cellular telephone service security server, said first table having multiple sequenced entries, each entry including a field for an indicator of previous use, said previous use indicator for each entry being initialized in an "unused" state, each entry containing at least one One Time Pad value;
    a second one-time pad cryptological table stored in an authentic cellular telephone device, initially synchronized with said multiple entries, fields, and indicators of previous use of said first one-time pad cryptological table;
    a first copy of said second one-time pad cryptological table stored in a cloned inauthentic cellular telephone device, said first copy being initially synchronized with said multiple entries, fields, and indicators of previous use of said second one-time pad cryptological table;
    a code transmitter portion of said authentic cellular telephone device configured to select an unused entry in said second one-time pad cryptological table, and to transmit said selected entry to a telephone network upon requesting initiation of a service session;
    a code exchanger portion of said cellular telephone service security server configured to receive a One Time Pad value from said authentic cellular telephone device and from said cloned inauthentic cellular telephone device upon request for initiation of a service session;
    a code comparator portion of said cellular telephone service security server configured to determine that said received One Time Pad value matches a sequentially next entry marked "unused" in said first one-time pad cryptological table;
    a service session grantor configured to grant said service request responsive to determination that said received One Time Pad value matches a sequentially next unused entry, including changing said used indicator to a "used" state in said first one-time pad cryptological table upon said grant of service, and further configured to disable service to said cloned inauthentic cellular telephone device responsive to determining that said first one-time pad cryptological table is not synchronized with said first copy of said second one-time pad cryptological table; and
    a table updater portion of said authentic cellular telephone device configured to, responsive to granting of said service request, mark said transmitted One Time Pad as "used", wherein said first one-time pad cryptological table and said second one-time pad cryptological tables are kept in synchronization.

2. The system as set forth in claim 1 wherein:
    said one-time pad cryptological tables further comprise a sequence index;
    said code comparator is further configured to determine if said received One Time Pad value is a next unused pad according to said sequence indicators; and
    said session grantor is configured to grant a session only if said received pad is a next expected One Time Pad value.

3. The system as set forth in claim 1 wherein:
    said one-time pad cryptological tables further comprise an expiration field for each entry;
    said code comparator is further configured to determine if said received pad is expired;
    said session grantor is configured to grant a session only if said received pad is unexpired; and
    said client device reconfigurator is configured to respond to said received pad being expired.

4. The system as set forth in claim 1 wherein said service session grantor is further configured to require a second step of acknowledgment between said service security server and said client device before said entry is marked as "used".

5. A method for authenticating a client device requesting a session of service from a service provider, said method comprising:
    providing a first one-time pad cryptological table accessible by a cellular telephone service security server, said table having multiple sequenced entries, each entry including a field for an indicator of previous use, said previous use indicator for each entry being initialized in an "unused" state, each entry containing at least one One Time Pad value;
    providing a second one-time pad cryptological table stored in an authentic cellular telephone device, initially synchronized with said multiple entries, fields, and indicators of previous use of said first one-time pad cryptological table;
    providing a first copy of said second one-time pad cryptological table stored in a cloned inauthentic cellular telephone device, said first copy being initially synchronized with said multiple entries, fields, and indicators of previous use of said second one-time pad cryptological table;
    selecting by a portion of said authentic cellular telephone device an unused entry in said second one-time pad cryptological table, and transmitting said selected entry to a telephone network upon requesting initiation of a service session;

receiving by a portion of said cellular telephone service security server a One Time Pad value from said authentic cellular telephone device or from said inauthentic clone cellular telephone device;

determining by a portion of said cellular telephone service security server if said received One Time Pad value matches a sequentially next entry marked as "unused" in said first one-time pad cryptological table;

responsive to determination that said received One Time Pad value matches a sequentially next unused entry, granting said service request and changing said used indicator corresponding to said One Time Pad entry in said first one-time pad cryptological table to a "used" state; and responsive to determining that said received One Time Pad value is marked as "used" in said first one-time pad cryptological table, disabling service to said cloned inauthentic cellular telephone device wherein authentication of said authentic cellular telephone device is completed without need for a service history counter.

6. The method as set forth in claim 5 wherein:

said one-time pad cryptological tables further comprise providing a sequence index field for each table entry;

determining that said received One Time Pad value is used comprises determining that said received One Time Pad is a next unused One Time Pad value according to said sequence indicators;

said granting comprises granting a session responsive to said received One Time Pad value being a next expected pad value.

7. The method as set forth in claim 6 wherein said challenging a user comprises challenging a user with one or more methods selected from a group comprising requiring a user name input, requiring a password input, requiring an account number input, requiring an answer to a secret question, and requiring a user-designated response.

8. The method as set forth in claim 5 wherein:

providing one-time pad cryptological tables further comprises providing an expiration field for each entry;

determining that said received One Time Pad comprises determining that said received One Time Pad is expired;

granting a session comprises granting a session only responsive to said received One Time Pad is unexpired; and challenging a user and replacing said tables comprises challenging a user responsive to said received pad being determined to be expired.

9. An article of manufacture for authenticating a client device requesting a session of service from a service provider, comprising:

a computer readable medium suitable for encoding one or more software programs; and one or more software programs configured to cause a processor to perform the steps of:

providing a first one-time pad cryptological table accessible by a cellular telephone service security server, said table having multiple sequenced entries, each entry including a field for an indicator of previous use, said previous use indicator for each entry being initialized in an "unused" state, each entry containing at least one One Time Pad value;

providing a second one-time pad cryptological table stored in an authentic cellular telephone device, initially synchronized with said multiple entries, fields, and indicators of previous use of said first one-time pad cryptological table;

providing a first copy of said second one-time pad cryptological table stored in a cloned inauthentic cellular telephone device, said first copy being initially synchronized with said multiple entries, fields, and indicators of previous use of said second one-time pad cryptological table;

selecting by a portion of said authentic cellular telephone device an unused entry in said second one-time pad cryptological table, and transmitting said selected entry to a telephone network upon requesting initiation of a service session;

receiving by a portion of said cellular telephone service security server a One Time Pad value from said authentic cellular telephone device or from said inauthentic clone cellular telephone device;

determining by a portion of said cellular telephone service security server if said received One Time Pad value matches a sequentially next entry marked as "unused" in said first one-time pad cryptological table;

responsive to determination that said received One Time Pad value matches a sequentially next unused entry, granting said service request and changing said used indicator corresponding to said One Time Pad entry in said first one-time pad cryptological table to a "used" state; and responsive to determining that said received One Time Pad value is marked as "used" in said first one-time pad cryptological table, disabling service to said cloned inauthentic cellular telephone device wherein authentication of said authentic cellular telephone device is completed without need for a service history counter.

10. The article as set forth in claim 9 wherein:

said software for providing one-time pad cryptological tables further comprises software configured to provide a sequence index field for each table entry;

said software for determining that said received One Time Pad value is used comprises software configured to determine that said received pad is a next unused pad value according to said sequence indicators; and said software for granting a session comprises software configured to grant a session only responsive to said received pad value being a next expected pad value.

11. The article as set forth in claim 9 further comprising software configured to challenge a user with one or more methods selected from a group comprising requiring a user name input, requiring a password input, requiring an account number input, requiring an answer to a secret question, and requiring a user-designated response.

12. The article as set forth in claim 9 wherein:

said software for providing one-time pad cryptological tables further comprises software configured to provide an expiration field for each entry;

said software for determining that said received One Time Pad comprises software configured to determine that said received One Time Pad is expired;

said software for granting a session comprises software configured to grant session only responsive to said received One Time Pad being unexpired; and said software for challenging a user and replacing said tables comprises software configured to challenge a user responsive to said received One Time Pad being determined to be expired.

* * * * *